(12) United States Patent
Ono et al.

(10) Patent No.: US 9,243,566 B2
(45) Date of Patent: Jan. 26, 2016

(54) METHOD OF CONTROLLING TURBINE EQUIPMENT AND TURBINE EQUIPMENT

(75) Inventors: Hitoi Ono, Hyogo (JP); Takashi Sonoda, Hyogo (JP); Naoto Tochitani, Tokyo (JP); Makoto Kato, Hyogo (JP); Masahide Umaya, Tokyo (JP); Fuminori Fujii, Hyogo (JP)

(73) Assignees: MITSUBISHI HEAVY INDUSTRIES, LTD., Tokyo (JP); PEBBLE BED MODULAR REACTOR (PTY) LIMITED, Centurion (ZA)

( * ) Notice: Subject to any disclaimer, the term of this patent is extended or adjusted under 35 U.S.C. 154(b) by 1061 days.

(21) Appl. No.: 12/934,022

(22) PCT Filed: Mar. 27, 2009

(86) PCT No.: PCT/JP2009/056931
§ 371 (c)(1),
(2), (4) Date: Sep. 22, 2010

(87) PCT Pub. No.: WO2009/119917
PCT Pub. Date: Oct. 1, 2009

(65) Prior Publication Data
US 2011/0027066 A1 Feb. 3, 2011

(30) Foreign Application Priority Data
Mar. 28, 2008 (JP) .................. 2008-088592

(51) Int. Cl.
*F02C 7/26* (2006.01)
*F02C 9/18* (2006.01)
(Continued)

(52) U.S. Cl.
CPC . *F02C 9/18* (2013.01); *F01K 13/02* (2013.01); *F02C 1/05* (2013.01); *F02C 1/10* (2013.01); *F02C 3/34* (2013.01); *F02C 7/26* (2013.01); *F05D 2260/85* (2013.01)

(58) Field of Classification Search
CPC ............ F02C 7/26; F02C 7/268; F02C 7/275; F02C 3/34; F02C 3/107; F02C 3/113; F02C 1/04–1/105; F02C 9/18; F02C 9/24; F05D 2260/606; F04D 27/0207
USPC ........ 60/644.1–647, 652, 656–658, 660–661, 60/772, 778, 788; 415/1, 28, 36
See application file for complete search history.

(56) References Cited

U.S. PATENT DOCUMENTS 3,394,265 A * 7/1968 Hendrickson ............. F02C 3/36
 290/2
4,163,365 A * 8/1979 Frutschi .................... F02C 9/16
 60/39.183
(Continued)

FOREIGN PATENT DOCUMENTS

EP 1719889 A1 11/2006
JP 50-22111 A 3/1975
(Continued)

OTHER PUBLICATIONS

Chinese Office Action dated Mar. 25, 2013, issued in corresponding Chinese Patent Application No. 200980110861.2, w/ English translation and concise explanation of relevance.
(Continued)

*Primary Examiner* — Thomas Denion
*Assistant Examiner* — Laert Dounis
(74) *Attorney, Agent, or Firm* — Westerman, Hattori, Daniels & Adrian LLP

(57) ABSTRACT

To provide a method of controlling a turbine equipment and a turbine equipment capable of carrying out a starting operation of controlling a load applied to a speed reducing portion while complying with a restriction imposed on an apparatus provided at a turbine equipment. The invention is characterized in including a temperature elevating step (S1) of elevating a temperature of a working fluid flowing to the turbine portion, a flow rate increasing step (S2) of increasing a flow rate of a working fluid bypassed from a delivery side to a suction side of the compressing portion when a temperature of the working fluid flowing to the turbine portion is elevated by a heat source portion, and a flow rate reducing step (S3) of reducing the flow rate of the bypassing working fluid after an elapse of a predetermined time period after increasing the flow rate of the bypassing working fluid.

5 Claims, 10 Drawing Sheets

(51) Int. Cl.
  *F02C 3/34* (2006.01)
  *F01K 13/02* (2006.01)
  *F02C 1/05* (2006.01)
  *F02C 1/10* (2006.01)

(56) References Cited

U.S. PATENT DOCUMENTS

| | | | |
|---|---|---|---|
| 5,743,715 A * | 4/1998 | Staroselsky | F04D 27/02 |
| | | | 415/1 |
| 6,751,940 B1 * | 6/2004 | Paul | 60/39.162 |
| 7,028,481 B1 | 4/2006 | Morrow | |
| 7,356,999 B2 * | 4/2008 | Bodell et al. | 62/228.3 |
| 7,603,860 B2 * | 10/2009 | Thomas | 60/650 |
| 2004/0131138 A1 * | 7/2004 | Correia et al. | 376/381 |
| 2009/0222188 A1 * | 9/2009 | Igarashi | F02B 37/16 |
| | | | 701/102 |

FOREIGN PATENT DOCUMENTS

| | | |
|---|---|---|
| JP | 59-206617 A | 11/1984 |
| JP | 08-068341 A | 3/1996 |
| JP | 3020853 B2 | 3/2000 |
| JP | 2000-154733 A | 6/2000 |
| JP | 2005-508492 A | 3/2005 |
| WO | 2007/024569 A2 | 3/2007 |

OTHER PUBLICATIONS

Russian Office Action Mar. 27, 2012, issued in Russian Patent Application 2010138699.06(055286), w/ concise explanation of relevance.

Japanese Office Action dated Oct. 25, 2011, issued in corresponding Japanese Patent Application No. 2011-501452.(w/partial translation).

International Search Report of PCT/JP2009/056931, mailing date Mar. 21, 2011.

Written Opinion of the International Searching Authority dated Mar. 21, 2011, issued in corresponding International Application No. PCT/JP2009/056931.

\* cited by examiner

METHOD OF CONTROLLING TURBINE EQUIPMENT AND TURBINE EQUIPMENT

TECHNICAL FIELD

The present invention relates to a method of controlling a turbine equipment and a turbine equipment, particularly relates to a method of controlling a turbine equipment and a turbine equipment preferably used in a closed cycle gas turbine for circulating a working fluid in a closed system by using an atomic reactor or the like for a heat source.

BACKGROUND ART

According to a closed cycle gas turbine of circulating a working fluid in a closed system by using an atomic reactor or the like for a heat source, an equipment capacity of a motor used for only operating to accelerate speed in starting, an electric apparatus SFC (Static Frequency Converter) or the like by using a generator as a motor is made to be as small as possible in order to achieve a reduction in plant construction cost.

Therefore, according to the closed cycle gas turbine, a speed is elevated to a rated revolution number in a state of reducing an amount of filling a working fluid in the closed system, for example, helium gas to a degree of circulating a fuel ball at inside of the atomic reactor by a flow of helium, and in a low temperature state.

In this way, a technology of reducing the amount of filling the working fluid in the closed system in starting has been proposed in a background art (refer to, for example, the Publication of Japanese Patent No. 3020853).

However, a temperature elevating rate of the atomic reactor is restricted, and therefore, even when the closed cycle gas turbine reaches the rated revolution number, the generator is used as the motor for some period of time. Therefore, there is continued an operation in a state in which a negative torque is loaded on a speed reduction gear or the like arranged between the closed cycle gas turbine and the generator.

Thereafter, the temperature of the working fluid flowing to the turbine is elevated by heat generation of the atomic reactor and a turbine output is increased. In the procedure, an axial output is changed from the negative output to the positive output and also a torque applied on the speed reduction gear or the like connecting the turbine and the generator is changed from the negative torque to a positive torque.

The speed reduction gear is prescribed with a necessary minimum torque for preventing a drawback of fretting or the like from being brought by shifting load sharing of the gear from a standard value by a self weight of the gear, or by shifting a contact position of teeth from a standard position.

Meanwhile, when the torque applied to the speed reduction gear or the like is changed from the negative torque to the positive torque as described above, there poses a problem that the torque necessarily becomes lower than the necessary minimum torque.

Further, since the temperature elevating rate of the atomic reactor is restricted, also a rate of increasing the torque applied to the speed reduction gear or the like is restricted and it is difficult to shorten a time period during which a torque becomes lower than the prescribed necessary minimum torque.

DISCLOSURE OF INVENTION

The invention has been carried out in order to resolve the above-described problem and it is an object thereof to provide a method of controlling a turbine equipment and a turbine equipment capable of carrying out a starting operation by controlling a load applied to a speed reducing portion while complying with a restriction imposed on an apparatus provided at a turbine equipment.

In order to achieve the above-described object, the invention provides the following means.

A method of controlling a turbine equipment of the invention is characterized by a method of controlling a turbine equipment including a compressing portion of compressing a working fluid, a heat source portion of heating the compressed working fluid, a turbine portion driven to rotate by the heated working fluid, and a circulating flow path for circulating the working fluid at least among the compressing portion, the heat source and turbine portion, the method comprising a temperature elevating step of elevating a temperature of the working fluid flowing to the turbine portion, a flow rate increasing step of increasing a flow rate of the working fluid bypassed from a delivery side to a suction side of the compressing portion in elevating a temperature of the working fluid flowing to the turbine portion by the heat source portion, and a flow rate reducing step of reducing the flow rate of the bypassed working fluid after an elapse of a predetermined time period after increasing the flow rate of the bypassed working fluid.

According to the invention, when the temperature of the working fluid flowing to the turbine portion is elevated, the flow rate of the bypassing working fluid is increased for a predetermined time period and thereafter, the flow rate of the bypassing working fluid is reduced, and therefore, a time period during which a load applied to the speed reducing portion becomes more proximate to 0 than a predetermined value can be shortened.

That is, when the temperature of the working fluid flowing to the turbine portion is started to elevate, by increasing the flow rate of the working fluid bypassed from the delivery side to the suction side of the compressor, that is, circulated from the delivery side to the suction side of the compressor, the torque necessary for driving the compressor is increased, and the load applied to the speed reducing portion is increased. Thereafter, with an elapse of time, the temperature of the working fluid flowing to the turbine portion is further elevated, and therefore, a rotational drive force generated at the turbine portion is increased and the load applied to the speed reducing portion becomes gradually proximate to 0.

When a predetermined time period has elapsed after starting to elevate the temperature of the working fluid, an absolute value of the load applied to the speed reducing portion becomes proximate to a predetermined value necessary for preventing a drawback of the speed reducing portion from being brought about and at the stage, the flow rate of the bypassing working fluid is reduced. At this occasion, the flow rate of the working fluid compressed by the compressor is reduced and the torque necessary for driving the compressor is reduced. At the same time, at the turbine portion, a sufficient rotational drive force is generated, and therefore, the load applied to the speed reducing machine becomes a load operated in a direction reverse to a direction up to that time. For example, when a load applied to the speed reducing machine in driving to rotate the compressor or the like by the generator is defined as a negative load, the load becomes a positive load. Further, a value of the positive load applied to the speed reducing machine becomes larger than the above-described predetermined value.

Further, the load applied to the speed reducing portion is controlled by controlling only the flow rate of the bypassing working fluid, and therefore, even in a case of a heat source a temperature elevating rate of which is restricted of, for example, the atomic reactor or the like, the load applied to the speed reducing portion can be controlled while complying with a restriction of the speed elevating rate or the like imposed on a heat source portion.

It is preferable that the invention further comprises a first calculating step of calculating the flow rate of the bypassed working fluid in the flow rate increasing step and the flow rate reducing step based on an elapsed time period after starting to elevate the temperature of the working fluid, a second calculating step of calculating a bypass flow rate necessary for preventing surging from being brought about in the compressor based on a pressure ratio between the suction side and the delivery side of the compressor, and the modified revolution number of the compressor calculated based on the temperature of the working fluid sucked to the compressor, a selecting step of selecting the bypass flow rate having a larger flow rate from the bypass flow rates calculated by the first and the second calculating step, and a flow rate controlling step of controlling the flow rate of the working fluid bypassed from the delivery side to the suction side of the compressing portion to the selected bypass flow rate.

According to the invention, the bypass flow rate having the larger flow rate is selected from the bypass flow rate based on the elapsed time period after starting to elevate the temperature of the working fluid and the bypass flow rate for preventing surging of the compressor from being brought about to be controlled to the bypass flow rate of selecting the flow rate of the bypassing working fluid, and therefore, it is prevented that the load applied to the speed reducing portion becomes proximate 0 more than the predetermined value and surging of the compressor is brought about.

A turbine equipment of the invention is provided with a compressing portion of compressing a working fluid, a turbine portion driven to rotate by the working fluid, a circulating flow path of circulating the working fluid at least between the compressing portion and the turbine portion, a bypass flow path for bypassing the working fluid from a delivery side to a suction side of the compressing portion, a flow rate controlling portion of controlling a flow rate of the working fluid flowing through the bypass flow path, a motor of driving to rotate the compressing portion and the turbine portion by way of a speed reducing portion in starting, and a control portion of carrying out the controlling method according to the invention.

According to the invention, by carrying out the controlling method of the invention by the control portion, the flow rate of the working fluid bypassed from the delivery side to the suction side of the compressor is controlled and the load applied to the speed reducing portion is controlled.

Further, the load applied to the speed reducing portion is controlled by controlling only the flow rate of the bypassing working fluid, and therefore, even in a case in which the heat source portion is a heat source a temperature elevating rate of which is restricted of, for example, the atomic reactor or the like, the load applied to the speed reducing portion can be controlled while complying with a restriction of the temperature elevating rate or the like imposed on the heat source portion.

According to the method of controlling the turbine equipment and the turbine equipment of the invention, when the temperature of the working fluid flowing to the turbine portion is elevated, by increasing the flow rate of the bypassed working fluid for the predetermined time period and thereafter reducing the flow rate of the bypassing working fluid, there is achieved an effect of capable of carrying out a starting operation of controlling the load applied to the speed reducing portion while complying with the restriction imposed on the apparatus provided at the turbine equipment.

BEST MODE FOR CARRYING OUT THE INVENTION

First Embodiment

A power generating equipment including a closed cycle gas turbine according to a first embodiment of the invention will be explained as follows in reference to FIG. 1 through FIG. 5.

Figure 1:
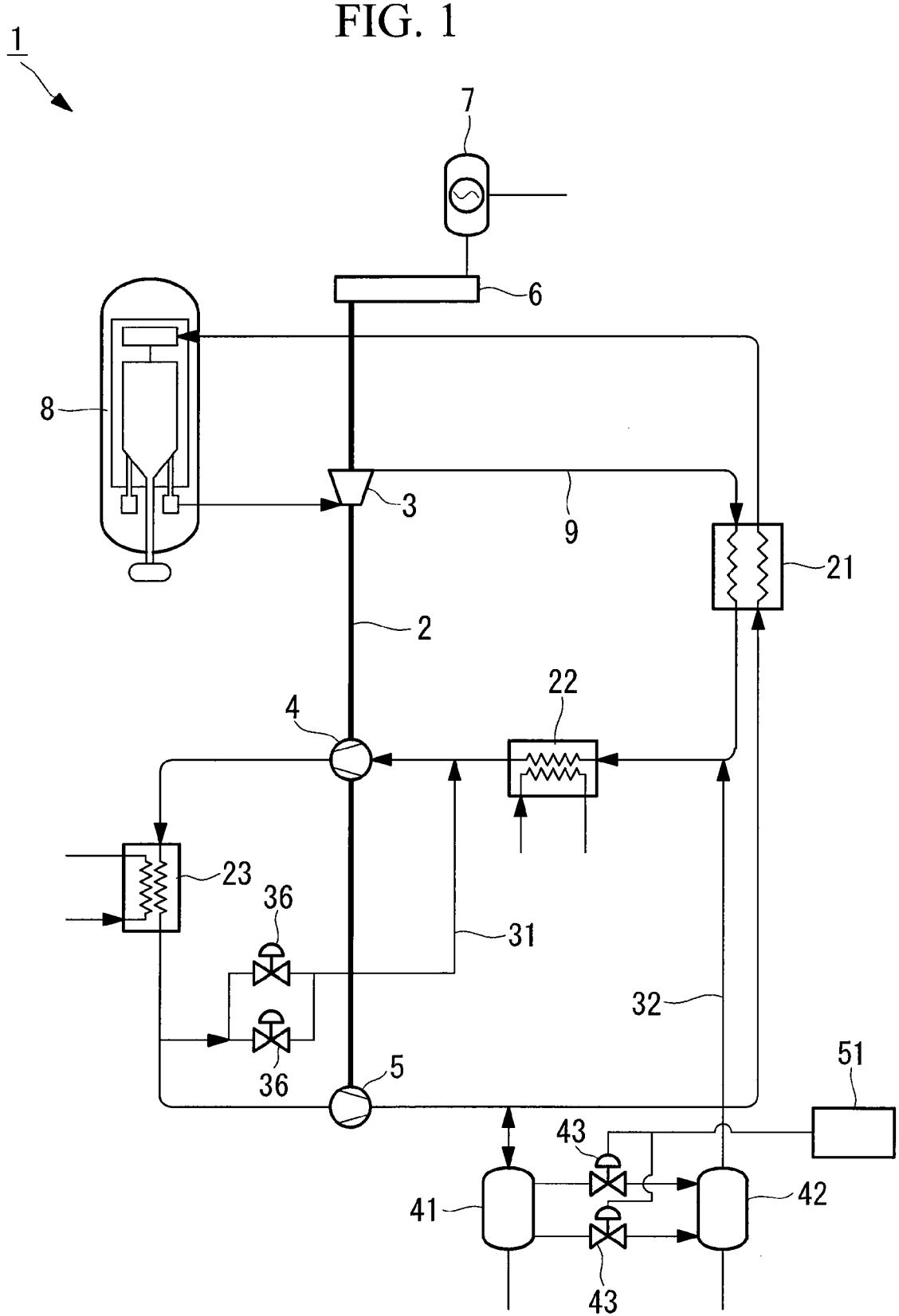
FIG. 1 is a schematic view for explaining a constitution of a power generating equipment according to a first embodiment of the invention.

FIG. 1 is a schematic view for explaining a constitution of a power generating equipment according to the embodiment.

According to the embodiment, an explanation will be given by applying the invention to a power generating equipment including a gas turbine for circulating a helium gas constituting a working fluid in a closed circulating system (closed style) and using an atomic reactor as a heat source of heating the compressed working fluid.

As shown by FIG. 1, a power generating equipment (turbine equipment) 1 is mainly provided with a turbine portion 3, a low pressure compressor (compressing portion) 4, a high pressure compressor (compressing portion) 5 and a speed reduction gear portion (speed reducing portion) 6 arranged on the same rotating shaft 2, a generator (motor) 7 connected to the speed reduction gear portion 6, an atomic reactor (heat source portion) 8 of heating a working fluid compressed by the high pressure compressor 5, and a circulating flow path 9 of circulating a working fluid in an order of the atomic reactor 8, the turbine portion 3, the low pressure compressor 4 and the high pressure compressor 5.

As shown by FIG. 1, the turbine portion 3 is arranged at the rotating shaft 2 and driven to rotate by the high temperature high pressure working fluid supplied from the atomic reactor 8.

The working fluid is connected to be able to flow by the circulating flow path 9 between the atomic reactor 8 and the turbine portion 3 and between the turbine portion 3 and the low pressure compressor 4.

As shown by FIG. 1, the low pressure compressor 4 is arranged at the rotating shaft 2 for compressing the working fluid by using a rotational drive force supplied by way of the rotating shaft 2.

The working fluid is connected to be able to flow by the circulating flow path 9 between the turbine portion 3 and the low pressure compressor 4 and between the low pressure compressor 4 and the high pressure compressor 5.

As shown by FIG. 1, the high pressure compressor 5 is arranged at the rotating shaft 2 for compressing the working fluid to a higher pressure by using a rotational drive force supplied by way of the rotating shaft 2.

The working fluid is connected to be able to flow by the circulating flow path 9 between the low pressure compressor 4 and the high pressure compressor 5 and between the high pressure compressor 5 and the atomic reactor 8.

As shown by FIG. 1, the atomic reactor 8 is arranged between the high pressure compressor 5 and the turbine portion 3 for supplying the high temperature high pressure working fluid to the turbine portion 3 by heating the high pressure working fluid delivered from the high pressure compressor 5.

The working fluid is connected to be able to flow by the circulating flow path 9 between the high pressure compressor 5 and the atomic reactor 8 and between the atomic reactor 8 and the turbine portion 3.

As shown by FIG. 1, the speed reduction gear portion 6 connects the rotating shaft 2 and the generator 7 to be able to transmit the rotational drive force for transmitting the rotational drive force from the rotating shaft 2 to the generator 7 or from the generator 7 to the rotating shaft 2 while converting a rotational number.

The speed reduction gear portion 6 is constituted by a combination of a plurality of gears and various combination styles can be used. For example, although a planetary gear can be used as the speed reduction gear portion 6, the invention is not particularly limited thereto.

As shown by FIG. 1, the generator 7 is connected to the speed reduction gear portion 6 to be able to transmit the rotational drive force and generates power by being driven to rotate by the turbine portion 3 by way of the rotating shaft 2 and the speed reduction gear portion 6 when the power generating equipment 1 is brought into an operating state.

On the other hand, in starting the power generating equipment 1, the generator 7 drives to rotate the turbine portion 3, the low pressure compressor 4 and the high pressure compressor 5 by way of the rotating shaft 2 and the speed reduction gear portion 6 by using a power supplied from outside.

As shown by FIG. 1, the circulating flow path 9 is a flow path for circulating the working fluid among the atomic reactor 8, the turbine portion 3, the low pressure compressor 4 and the high pressure compressor 5.

The circulating flow path 9 is provided with a regenerating heat exchanger 21 for carrying out heat exchange between the working fluid flowing out from the turbine portion 3 and the working fluid delivered from the high pressure compressor 5, a cooler 22 for carrying out heat exchange between the working fluid sucked to the low pressure compressor 4 and sea water, and an intermediate cooler 23 for carrying out heat exchange between the working fluid delivered from the low pressure compressor 4 and sea water.

As shown by FIG. 1, the regenerating heat exchanger 21 is a heat exchanger for heating the working fluid flowing to the atomic reactor 8 by recovering heat from the working fluid flowing out from the turbine portion 3. The regenerating heat exchanger 21 is arranged between the turbine portion 3 and the low pressure compressor 4 and between the high pressure compressor 5 and the atomic reactor 8.

As shown by FIG. 1, the cooler 22 is a heat exchanger for radiating heat of the working fluid flowing out from the regenerating heat exchanger 21 to sea water. The cooler 22 is arranged between the regenerating heat exchanger 21 and the low pressure compressor 4.

Further, the cooler 22 of a constitution of radiating heat of the working fluid to sea water as described above may be used, or a heat exchanger of a constitution of radiating heat of the working fluid to other medium may be used and the invention is not particularly limited.

As shown by FIG. 1, the intermediate cooler 23 is a heat exchanger of radiating heat of the working fluid delivered from the low pressure compressor 4 to sea water. The intermediate cooler 23 is arranged between the low pressure compressor 4 and the high pressure compressor 5.

Further, the intermediate cooler 23 of a constitution of radiating heat of the working fluid to sea water as described above may be used, the heat exchanger of a constitution of radiating heat of the working fluid to other medium may be used, and the invention is not particularly limited.

Further, as shown by FIG. 1, the circulating flow path 9 is provided with a first bypass flow path (bypass flow path) 31 of increasing a flow rate of the working fluid sucked to the low pressure compressor 4, and a second bypass flow path (bypass flow path) 32 for controlling an amount of filling the working fluid, that is, a flow rate of the working fluid flowing at inside of the circulating flow path 9 and increasing a flow rate of the working fluid sucked to the low pressure compressor 4 and the high pressure compressor 5.

As shown by FIG. 1, the first bypass flow path 31 is a flow path of recirculating a portion of the working fluid flowing out from the intermediate cooler 23 to between the low pressure compressor 4 and the cooler 22. In other words, the first bypass flow path 31 is a flow path one end of which is connected to the circulating flow path 9 between the intermediate cooler 23 and the high pressure compressor 5 and other end of which is connected to the circulating flow path 9 between the cooler 22 and the low pressure compressor 4.

The first bypass flow path 31 is provided with a first bypass valve 36 for controlling a flow rate of the recirculating working fluid.

As shown by FIG. 1, the first bypass valve 36 is a valve arranged at the first bypass flow path 31 for controlling the flow rate of the working fluid flowing in the first bypass flow path 31. In other words, the first bypass valve 36 is a valve of controlling the flow rate of the working fluid sucked to the low pressure compressor 4 and prevents surging at the low pressure compressor 4 from being brought about by controlling the flow rate.

Although according to the embodiment, an explanation will be given by being applied to an example of arranging the two first bypass valves 36 in parallel, a number of the first bypass valves 36 may be larger or smaller than two and is not particularly limited.

As shown by FIG. 1, the second bypass flow path 32 is a flow path of filling the working fluid to one or both of a delivery side of the high pressure compressor 5 and a suction side of the low pressure compressor 4 and a flow path of recirculating a portion of the working fluid delivered from the high pressure compressor 5 to between the regenerating heat exchanger 21 and the cooler 22. In other words, the second bypass flow path 32 is a flow path one end portion of which is connected to between the high pressure compressor 5 and the regenerating heat exchanger 21 and other end portion of which is connected to between the regenerating heat exchanger 21 and the cooler 22.

The second bypass flow path 32 is provided with a first buffer tank 41 and a second buffer tank 42 connected to outside working fluid filling system and a second bypass valve (flow rate controlling portion) 43 arranged between the first buffer tank 41 and the second buffer tank 42.

The first buffer tank 41 is a tank arranged on a side of the high pressure compressor 5 of the second bypass flow path 32. The second buffer tank 42 is a tank arranged on a side of the cooler 22 of the second bypass flow path 32.

When the working fluid is filled to the circulating flow path 9, the working fluid is filled from the working fluid filling system by way of one or both of the first buffer tank 41 and the second buffer tank 42.

On the other hand, when the flow rate of the working fluid sucked to the low pressure compressor 4 and the high pressure compressor 5 is controlled, a portion of the working fluid delivered from the high pressure compressor 5 is made to flow in an order of the first buffer tank 41 and the second buffer tank 42 and is recirculated to between the regenerating heat exchanger 21 and the cooler 22.

As shown by FIG. 1, the second bypass valve 43 is a valve arranged at the second bypass flow path 32 between the first buffer tank 41 and the second buffer tank 42 for controlling the flow rate of the working fluid flowing in the second bypass flow path 32. In other words, the second bypass valve 43 is a valve of controlling the flow rate of the working fluid sucked to the low pressure compressor 4 and the high pressure compressor 5 in operating the power generating equipment 1 and is a valve of controlling a torque applied to the speed reduction gear portion 6 in starting.

Figure 2:
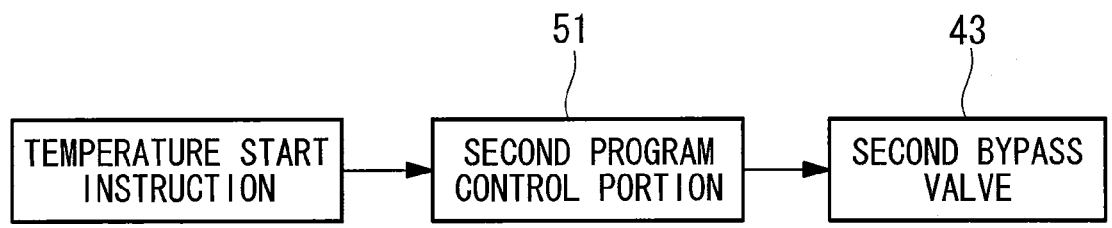
FIG. 2 is a block diagram for explaining a control of the power generating equipment of FIG. 1.

As shown by FIG. 2, the second bypass valve 43 is inputted with a control signal for controlling a valve opening degree from a second program control portion 51.

Although according to the embodiment, an explanation will be given by being applied to an example of arranging two of the second bypass valves 43 in parallel, a number of the second bypass valves 43 may be larger or smaller than two and is not particularly limited.

FIG. 2 is a block diagram for explaining a control of a power generating equipment of FIG. 1.

Further, according to the power generating equipment 1, as shown by FIG. 2, based on the temperature elevation start instruction, the second program control portion (control portion) 51 is provided for controlling the second bypass valve 43.

An explanation will be given as follows of a control of the first bypass valve 36 of the second program control portion 51.

Next, an explanation will be given of power generation of the power generating equipment 1 comprising the above-described constitution.

When an operation, that is, power generation is carried out at the power generating equipment 1, as shown by FIG. 1, the high pressure working fluid flowing to the atomic reactor 8 is further heated by absorbing heat generated at the atomic reactor 8, and flows from the atomic reactor 8 to the circulating flow path 9 as, for example, the working fluid at about 900° C.

The working fluid flows from the circulating flow path 9 to the turbine portion 3. The turbine portion 3 generates a rotational drive force from an energy provided to the flowing high temperature high pressure working fluid flowing and transmits the generated rotational drive force to the rotating shaft 2.

The rotational drive force is transmitted from the rotating shaft 2 to the speed reduction gear portion 6 and is transmitted from the speed reduction gear portion 6 to the generator 7. A revolution number of the rotating shaft 2 is reduced to a revolution number pertinent for driving the generator 7 by the speed reduction gear portion 6.

The generator 7 generates power by being driven to rotate by the transmitted rotational drive force.

On the other hand, a temperature of the working fluid is lowered to about 500° C. in flowing from the turbine portion 3 and the working fluid flows to the regenerating heat exchanger 21 by way of the circulating flow path 9. At the regenerating heat exchanger 21, heat exchange is carried out between the working fluid flowing from the turbine portion 3 and the working fluid delivered from the high pressure compressor 5 mentioned later to flow from the regenerating heat exchanger 21.

The working fluid flowing from the regenerating heat exchanger 21 flows to the cooler 22 by way of the circulating flow path 9 to carry out heat exchange between the working fluid and sea water, cooled to about 20° C., thereafter flows from the cooler 22.

The working fluid flowing from the cooler 22 is sucked to the low pressure compressor 4 by way of the circulating flow path 9. The low pressure compressor 4 compresses the sucked working fluid by the rotational drive force supplied from the turbine portion 3 by way of the rotating shaft 2 to deliver to the circulating flow path 9.

The working fluid delivered from the low pressure compressor 4 flows to the intermediate cooler 23 by way of the circulating flow path 9 to carry out heat exchange between the working fluid and sea water, cooled to about 20° C., thereafter flows from the intermediate cooler 23.

The working fluid flowing from the intermediate cooler 23 is sucked to the high pressure compressor 5 by way of the circulating flow path 9. The high pressure compressor 5 compresses the working fluid compressed by the low pressure compressor 4 to a higher pressure by the rotational drive force supplied from the turbine portion 3 by way of the rotating shaft 2 to deliver to the circulating flow path 9.

The working fluid delivered from the high pressure compressor 5 flows to the regenerating heat exchanger 21 by way of the circulating flow path 9, carries out heat exchange between the working fluid and the working fluid flowing from the turbine portion 3, heated to, for example, about 450° C. and flows to the circulating flow path 9.

The working fluid flowing from the regenerating heat exchanger 21 flows to the atomic reactor 8 by way of the circulating flow path 9 and the above-described procedure is repeated.

When the flow rate of the working fluid flowing in the circulating flow path 9 is small, in other words, the flow rate of the working fluid flowing to the low pressure compressor 4 is small, the first bypass valve 36 is opened to prevent surging of the low pressure compressor 4 from being brought about.

That is, by opening the first bypass valve 36, a portion of the working fluid delivered from the low pressure compressor 4 and flowing from the intermediate cooler 23 flows to the circulating flow path 9 between the cooler 22 and the low pressure compressor 4 by way of the first bypass flow path 31. Therefore, in comparison with the circulating flow rate of the working fluid of a total of the circulating flow path 9, a flow rate of the working fluid flowing to the low pressure compressor 4 is increased to prevent surging of the low pressure compressor 4 from being brought about.

On the other hand, when the flow rate of the working fluid flowing to the low pressure compressor 4 and the high pressure compressor 5 is small, the second bypass valve 43 is opened to prevent surging of the low pressure compressor 4 to the high pressure compressor 5 from being brought about.

That is, by opening the second bypass valve 43, a portion of the working fluid delivered from the high pressure compressor 5 flows to the circulating flow path 9 between the regenerating heat exchanger 21 and the cooler 22 by way of the second bypass flow path 32, the first buffer tank 41 and the second buffer tank 42. Therefore, in comparison with the circulating flow rate of the working fluid of the total of the circulating flow path 9, the flow rate of the working fluid flowing to the low pressure compressor 4 and the high pressure compressor 5 is increased to prevent surging of the low pressure compressor 4 and the high pressure compressor 5 from being brought about.

Further, when an amount of filling the working fluid circulating in the circulating flow path 9 is small, the working fluid is filled at inside of the circulating flow path 9 from the working fluid filling system connected by way of the first buffer tank 41 and the second buffer tank 42.

Next, an explanation will be given of a control in starting the power generating equipment 1 constituting a characteristic of the embodiment.

Figure 3:
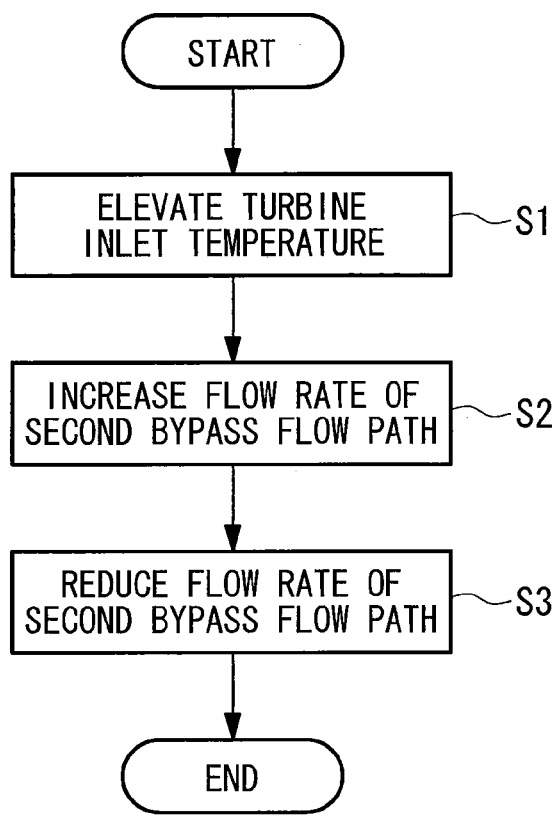
FIG. 3 is a flowchart for explaining a control in starting the power generating equipment of FIG. 1.

FIG. 3 is a flowchart for explaining the control in starting the power generating equipment of FIG. 1.

In starting the power generating equipment 1, as shown by FIG. 1, a power is supplied to the generator 7 from outside. The generator 7 supplied with the power generates the rotational drive force as the motor and drives to rotate the turbine portion 3, the low pressure compressor 4 and the high pressure compressor 5 by way of the speed reduction gear portion 6 and the rotating shaft 2.

Figure 4:
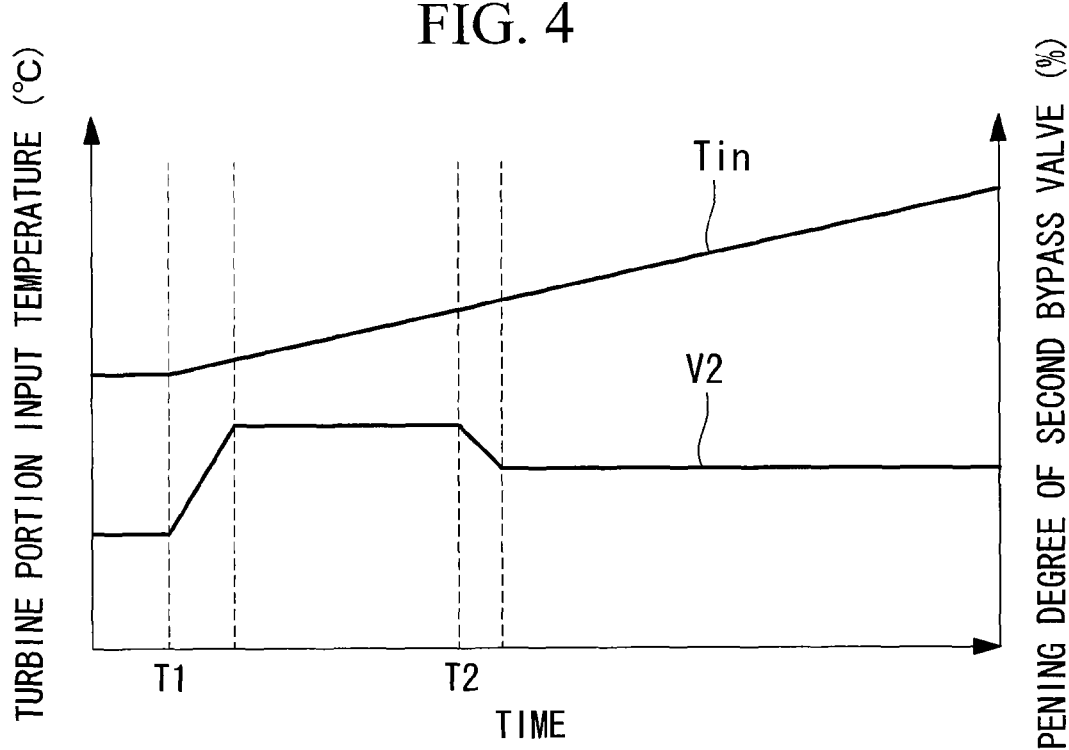
FIG. 4 is a graph for explaining a change over time of a working fluid flowing to a turbine portion of the power generating equipment of FIG. 1 and a change over time of an opening degree of a second bypass valve.
Figure 5:
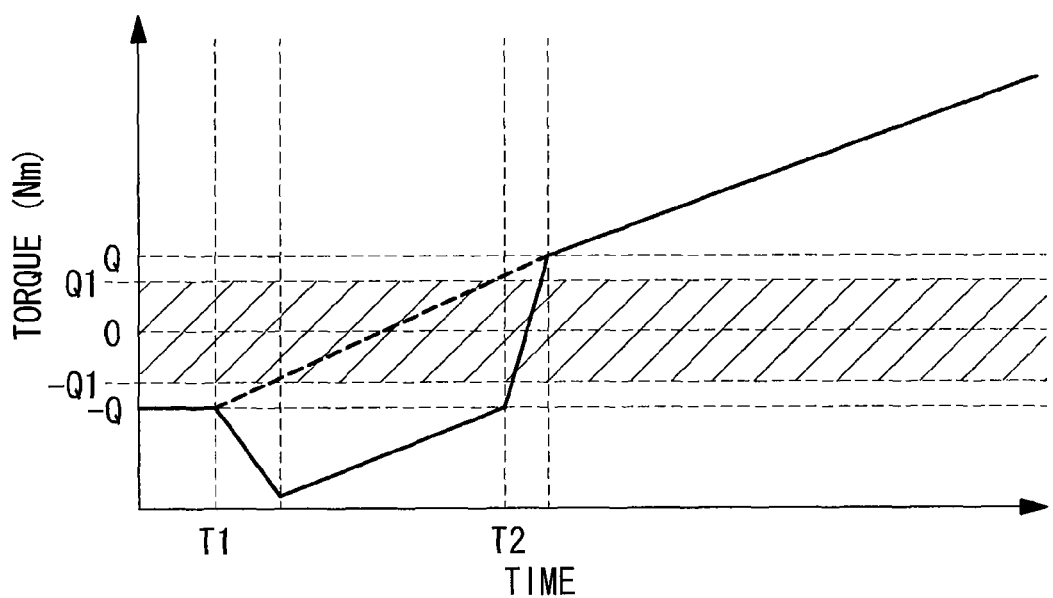
FIG. 5 is a graph for explaining a torque applied to a speed reduction gear portion of the power generating equipment of FIG. 1.

FIG. 4 is a graph for explaining a change over time of a temperature of the working fluid flowing to the turbine portion of the power generating equipment of FIG. 1, and a change over time of an opening degree of the second bypass valve. FIG. 5 is a graph for explaining a torque applied to the speed reduction gear portion of the power generating equipment of FIG. 1.

Here, a positive torque in FIG. 5 indicates a value of a torque applied to the speed reduction gear portion 6 when the generator 7 is driven to rotate by the turbine portion 3, and a negative torque indicates a value of a torque applied to the speed reduction gear portion 6 when the turbine portion 3, the low pressure compressor 4 and the high pressure compressor 5 are driven to rotate by the generator 7.

The turbine portion 3 and the like are driven to rotate by a rated revolution number of, for example, about 6000 revolutions per minute until the power generating equipment 1 is started and a temperature elevation start instruction is inputted (T1). At this occasion, the temperature Tin of the working fluid flowing to the turbine portion 3, and the opening degree V2 of the second bypass valve 43 are controlled constant as shown by FIG. 4 and FIG. 5. Thereby, the torque applied to the speed reduction gear portion 6 is controlled to a negative torque −Q.

Thereafter, when the temperature elevation start instruction is inputted to the power generating equipment 1 (T1), temperature elevation of the atomic reactor 8 is started, as shown by FIG. 4, also temperature elevation of the temperature Tin of the working fluid heated by the atomic reactor 8 and flowing to the turbine portion 3 is started (step S1 (temperature elevating step)).

At the same time, the second program control portion 51 carries out a control of opening the opening degree V2 of the second bypass valve 43 (step S2 (flow rate increasing step)).

When the temperature Tin of the working fluid flowing to the turbine portion 3 is elevated, the rotational drive force is generated at the turbine portion 3. On the other hand, by opening the second bypass valve 43, the flow rate of the working fluid recirculated from the delivery side of the high pressure compressor 5 to the circulating flow path 9 between the regenerating heat exchanger 21 and the cooler 22 is increased and the torque necessary for driving the low pressure compressor 4 and the high pressure compressor 5 is increased.

While an absolute value of the torque supplied to the speed reduction gear portion 6 is reduced by the rotational drive force of the turbine portion 3, the absolute value is increased by an increase in the torque of driving the low pressure compressor 4 and the high pressure compressor 5, and therefore, the absolute value is increased as shown by FIG. 5 as a whole (reduced as proceeding to the right side of FIG. 5).

Even after the second bypass valve 43 has been opened, temperature elevation of the atomic reactor 8 is continued, and as shown by FIG. 4, also the temperature Tin of the working fluid flowing to the turbine portion 3 continues to be elevated.

Therefore, also the rotational drive force generated at the turbine portion 3 continues increasing, and as shown by FIG. 5, the absolute value of the torque applied to the speed reduction gear portion 6 is reduced in accordance with temperature elevation of the working fluid flowing to the turbine portion 3 (increased as proceeding to the right side of FIG. 5).

When a predetermined time period has elapsed after inputting the temperature elevation start instruction (T2), the torque applied to the speed reduction gear portion 6 becomes a target torque −Q.

Here, the second program control portion 51 carries out a control of reducing an opening degree V2 of the second bypass valve 43 (step S3 (flow rate reducing step)).

When the opening degree V2 of the second bypass valve 43 is reduced, the flow rate of the working fluid circulated from the delivery side of the high pressure compressor 5 to the circulating flow path 9 between the regenerating heat exchanger 21 and the cooler 22 is reduced, and a torque necessary for driving the low pressure compressor 4 and the high pressure compressor 5 is reduced.

The torque applied to the speed reduction gear portion 6 is swiftly increased and goes across an interval of a negative predetermined torque (predetermined value) −Q1 to a positive predetermined torque (predetermined value) Q1 by a reduction in the torque necessary for driving the low pressure compressor 4 and the high pressure compressor 5.

Here, a graph indicated by a dotted line in FIG. 5 shows a change over time of the torque applied to the speed reduction gear portion 6 when the temperature Tin of the working fluid flowing to the turbine portion 3 is elevated without controlling the opening degree of the second bypass valve 43.

As shown by FIG. 5, by controlling the opening degree of the second bypass valve 43 by the second program control portion 51, a time period of the torque applied to the speed reduction gear portion 6 in an interval from the positive first predetermined torque Q1 to the negative first predetermined torque −Q1 is shortened.

Further, at a region between the positive first predetermined torque Q1 through the negative first predetermined torque −Q1 in FIG. 5 is a region in which a value of the torque applied to the speed reduction gear portion 6 is small, and a possibility of bringing about fretting at a gear or the like constituting the speed reduction gear portion 6 is high.

According to the above-described constitution, when the temperature Tin of the working fluid flowing to the turbine portion 3 is elevated, the flow rate of the bypassing working fluid is increased during a predetermined time period, thereafter, the flow rate of the bypassing working fluid is reduced, and therefore, a time period during which the absolute value of the torque applied to the speed reduction gear portion 6 becomes proximate to 0 more than the predetermined torque −Q1 can be shortened. Therefore, when a starting operation is carried out, the torque applied to the speed reduction gear portion 6 can be controlled while complying with a restriction imposed on an apparatus provided at the power generating equipment 1 of a temperature elevating rate or the like imposed on the atomic reactor 8.

Further, the torque applied to the speed reduction gear portion 6 is controlled by controlling only the flow rate of the bypassing working fluid, and therefore, even in the power generating equipment 1 using the heat source of the atomic reactor 8 or the like the temperature elevating rate of which is restricted, the torque applied to the speed reduction gear portion 6 can be controlled while complying with the restriction of the temperature elevating rate or the like imposed on the atomic reactor 8.

Modified Example of First Embodiment

Next, a modified example of the first embodiment of the invention will be explained in reference to FIG. 6 and FIG. 7.

Although a basic constitution of a power generating equipment of the modified example is similar to that of the first embodiment, the modified example differs from the first embodiment in a control of the first bypass valve. Therefore, according to the embodiment, only the control of the first bypass valve will be explained in reference to FIG. 6 and FIG. 7, and an explanation of other constituent elements or the like will be omitted.

Figure 6:
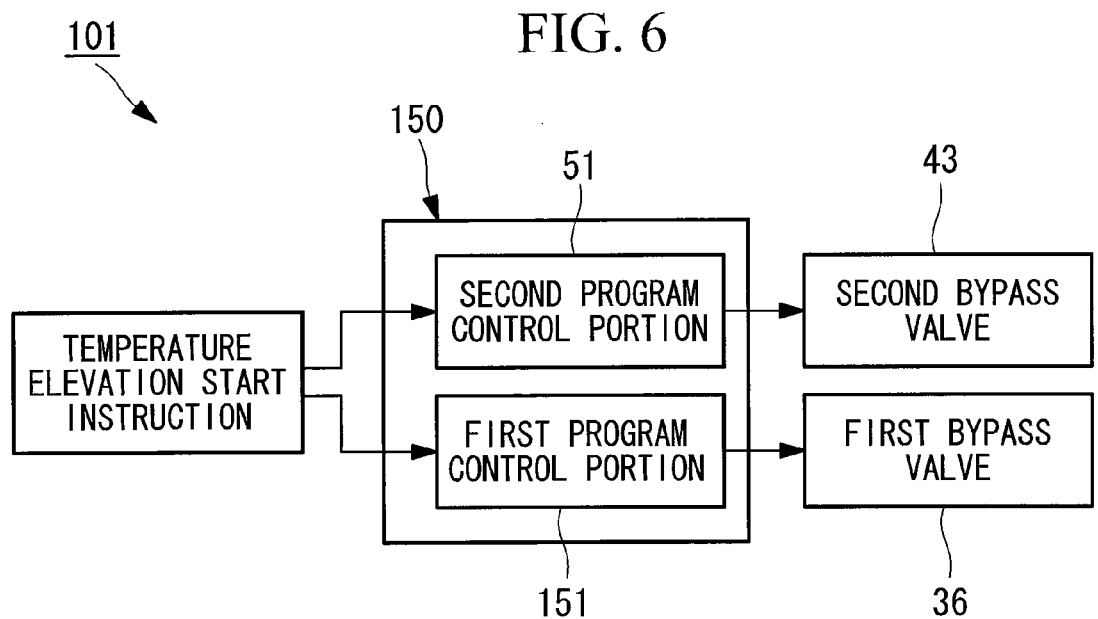
FIG. 6 is a block diagram for explaining a control of a power generating equipment according to a modified example of the first embodiment of the invention.

FIG. 6 is a block diagram for explaining the control of the power generating equipment of the modified example.

Further, constituent elements the same as those of the first embodiment are attached with the same notations and an explanation thereof will be omitted.

As shown by FIG. 6, a control portion 150 of a power generating equipment 101 of the embodiment is provided with the second program control portion 51 for controlling the opening degree of the second bypass valve 43, and a first program control portion (control portion) 151 for controlling the opening degree of the first bypass valve (flow rate control portion) 36.

The first program control portion 151 controls the opening degree of the first bypass valve 36 based on the temperature elevation start instruction.

The control of the opening degree of the first bypass valve 36 in the program control portion 151 will be explained as follows.

Next, a control in starting the power generating equipment 101 constituting a characteristic of the embodiment will be explained.

Further, in starting, although the second program control portion 51 and the first program control portion 151 respectively control the opening degrees of the second bypass valve 43 and the first bypass valve 36, the control of the opening degree of the second bypass valve 43 by the second program control portion 51 is similar to the control in the first embodiment, and therefore, an explanation thereof will be omitted.

Further, power generation at the power generating equipment 101 is similar to the power generation according to the first embodiment, and therefore, an explanation thereof will be omitted.

Figure 7:
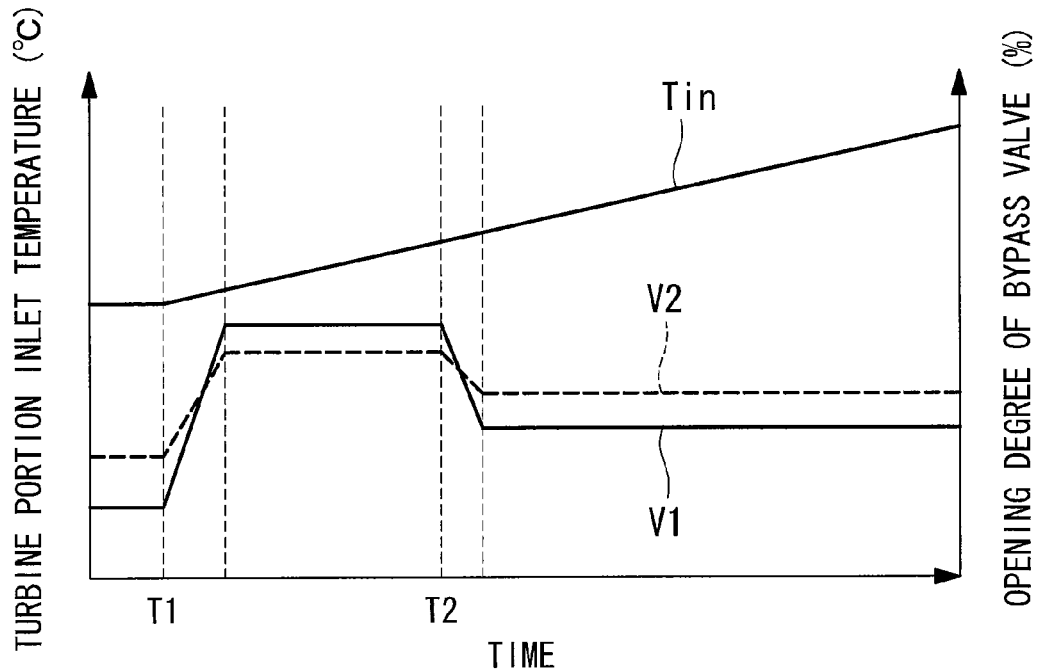
FIG. 7 is a graph for explaining a change over time of a temperature of the working fluid flowing to the turbine portion and changes over time of first and second bypass valve opening degrees in starting the power generating equipment of FIG. 6.

FIG. 7 is a graph for explaining a change over time of a temperature of the working fluid flowing to the turbine portion in starting the power generating equipment of FIG. 6 and changes over time of the first and the second bypass opening degrees. Further, a graph V1 in FIG. 7 shows the opening degree of the first bypass valve 36 and a graph V2 shows the opening degree of the second bypass valve 43.

The turbine portion 3 and the like are driven to rotate by a rated revolution number of, for example, 6000 rotations per minute until the power generating equipment 101 is started and the temperature elevation start instruction is inputted (T1). At this occasion, the temperature Tin of the working fluid flowing to the turbine portion 3, the opening degree V1 of the first bypass valve 36 and the opening degree V2 of the second bypass valve 43 are controlled constant as shown by FIG. 7.

Thereafter, when the temperature elevation start instruction is inputted to the power generating equipment 101 (T1), temperature elevation of the atomic reactor 8 is started, as shown by FIG. 7, also elevation of the temperature Tin of the working fluid heated by the atomic reactor 8 and flowing to the turbine portion 3 is started.

At the same time, the first program control portion 151 carries out a control of opening the opening degree V2 of the first bypass valve 36.

When the first bypass valve 36 is opened, a portion of a refrigerant delivered from the low pressure compressor 4 and passing the intermediate cooler 23 is recirculated to the suction side of the low pressure compressor 4 by way of the first bypass flow path 31. In other words, a flow rate of the working fluid compressed by the low pressure compressor 4 is increased and a drive torque necessary for driving the low pressure compressor 4 is increased (refer to FIG. 1).

Then, also the absolute value of the torque applied to the speed reduction gear portion 6 arranged between the generator 7 constituting a motor and the low pressure compressor 4 is increased.

After opening the first bypass valve 36 and the second bypass valve 43, temperature elevation of the atomic reactor 8 is continued, and as shown by FIG. 7, also the temperature Tin of the working fluid flowing to the turbine portion 3 continues to be elevated.

Therefore, also a rotational drive force generated at the turbine portion 3 continues to be increased and similar to the first embodiment, the absolute value of the torque applied to the speed reduction gear portion 6 is reduced in accordance with temperature elevation of the working fluid flowing to the turbine portion 3.

When a predetermined time period has elapsed after inputting the temperature elevation start instruction (T2), the torque applied to the speed reduction gear portion 6 becomes the target torque −Q.

Here, the first program control portion 151 and the second program control portion 51 carry out a control of respectively reducing the opening degree V1 of the first of the first bypass valve 36 and the opening degree V2 of the second bypass valve 43 as shown by FIG. 7.

When the opening degree V1 of the first bypass valve 36 is reduced, the flow rate of the working fluid recirculated from the delivery side to the suction side of the low pressure compressor 4 is reduced and the torque necessary for driving the low pressure compressor 4 is reduced.

The torque applied to the speed reduction gear portion 6 is swiftly increased and goes across an interval between the negative predetermined torque (predetermined value) −Q1 and the positive predetermined torque (predetermined value) Q1 by a reduction in the torque necessary for driving the low pressure compressor 4 and the high pressure compressor 5.

According to the above-described constitution, by controlling the opening degree V1 of the first bypass valve 36 and the opening degree V2 of the second bypass valve 43 respectively by using the first program control portion 51 and the second program control portion 151, the control of the torque applied to the speed reduction gear portion 6 is facilitated.

That is, a total capacity of the first and the second bypass valves 36, 43 can be used for controlling the torque applied to the speed reduction gear portion 6, and therefore, it is not necessary to constitute either one of the first bypass valve and the second bypass valve 43 by large-sized formation or increase a number of pieces thereof. Therefore, a change or an addition of operation end used for controlling the torque applied to the speed reduction gear portion 6 is dispensed with and an increase in initial cost of the power generating equipment 101 can be restrained.

Second Embodiment

Next, a second embodiment of the invention will be explained in reference to FIG. 8 through FIG. 10.

Although a basic constitution of a power generating equipment of the embodiment is similar to that of the first embodiment, the second embodiment differs from the first embodiment in a method of controlling the second bypass valve. Therefore, according to the embodiment, only the method of controlling the second bypass valve will be explained in reference to FIG. 8 through FIG. 10 and an explanation of other constituent element or the like will be omitted.

Figure 8:
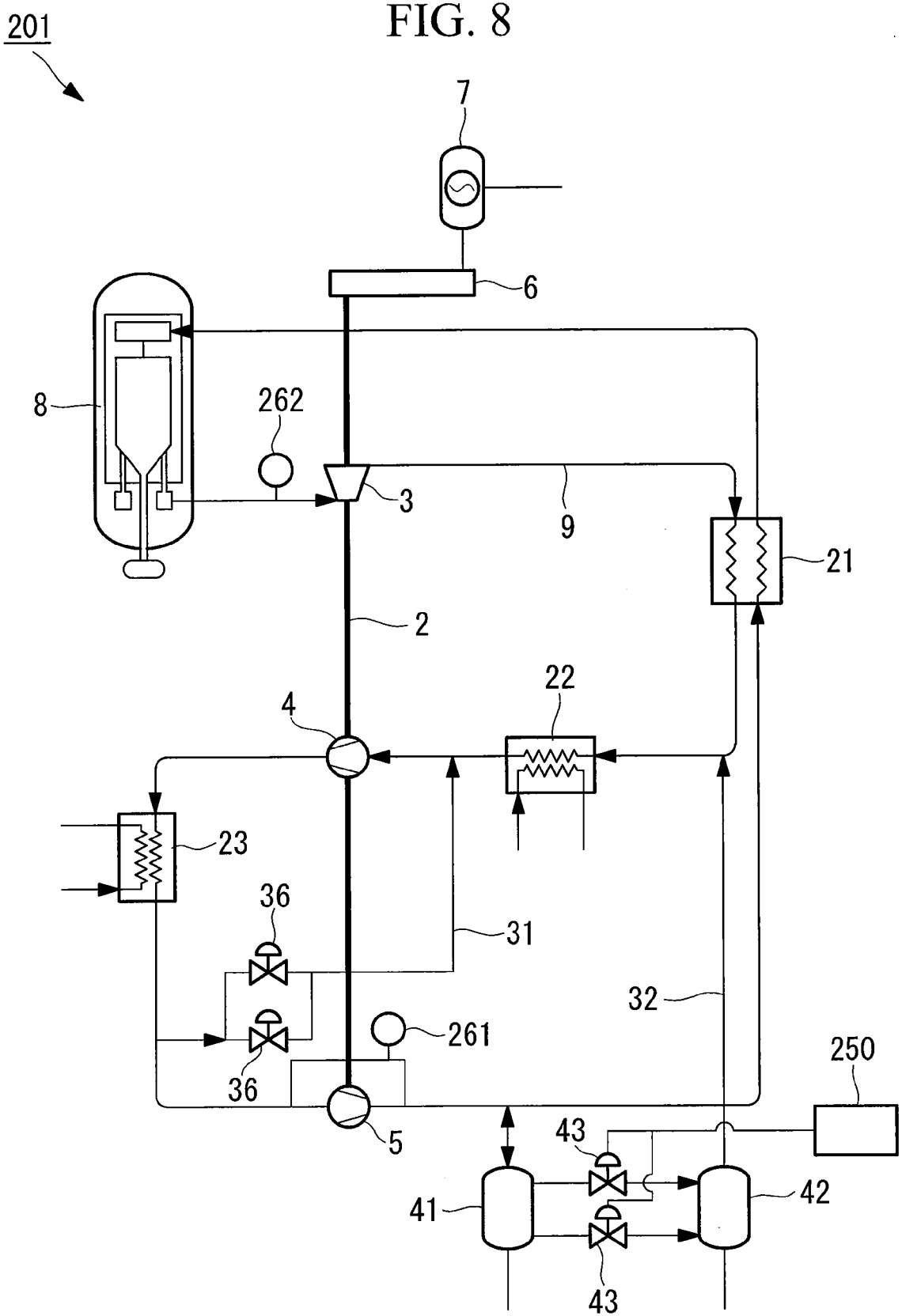
FIG. 8 is a flowchart for explaining a constitution of a power generating equipment according to a second embodiment of the invention.

FIG. 8 is a schematic view for explaining a constitution of a power generating equipment according to the embodiment. FIG. 9 is a block diagram for explaining a control of the power generating equipment of FIG. 8.

Further, constituent elements the same as those of the first embodiment are attached with the same notations and an explanation thereof will be omitted.

Figure 9:
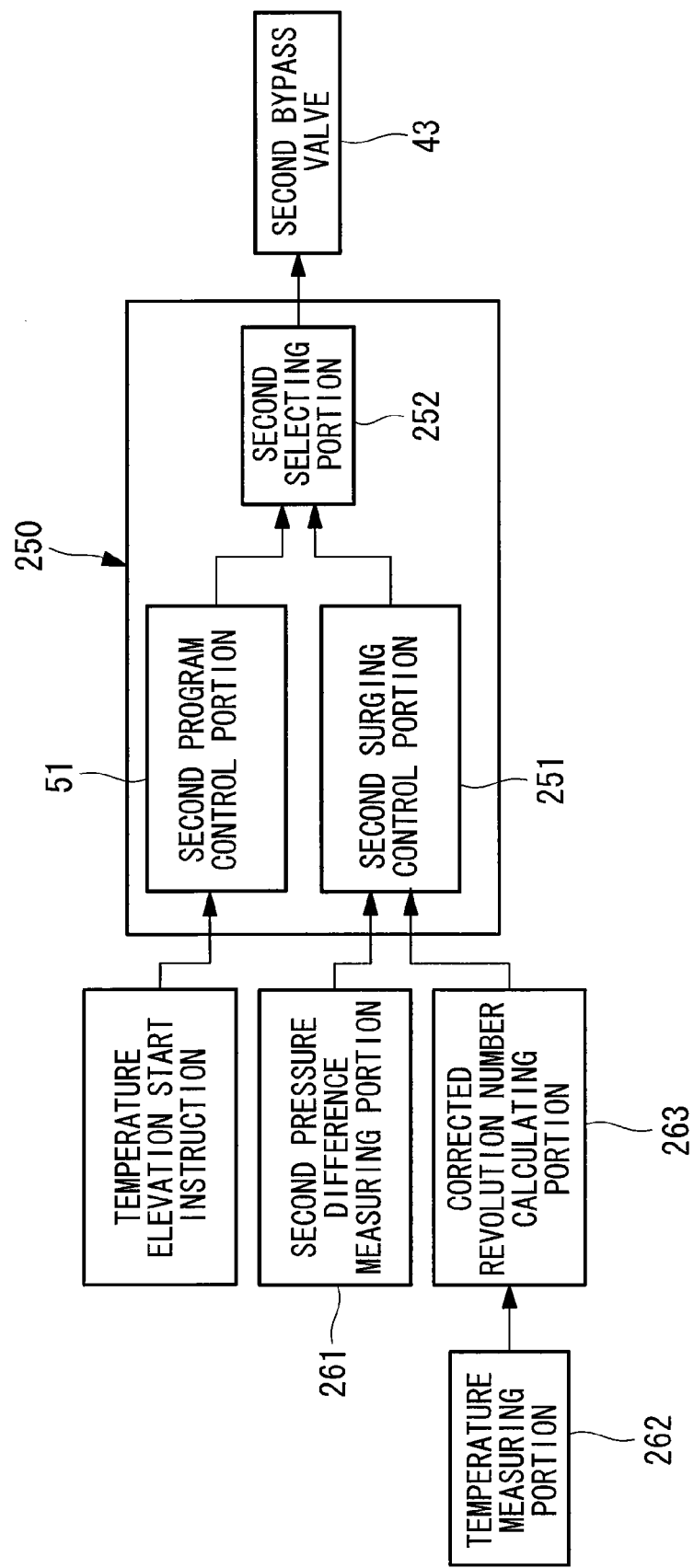
FIG. 9 is a block diagram for explaining a control of the power generating equipment of FIG. 8.

As shown by FIG. 8 and FIG. 9, a power generating equipment 201 of the embodiment is further provided with a second pressure ratio measuring portion 261 for measuring a pressure ratio of a pressure of the working fluid on the suction side and the working fluid pressure on the delivery side of the high pressure compressor 5, a temperature measuring portion 262 for measuring a temperature of the working fluid flowing to the turbine portion 3, and a corrected revolution number calculating portion 263 for calculating a corrected revolution number.

As shown by FIG. 8, the second pressure ratio measuring portion 261 is a measuring portion for measuring a ratio of a pressure of the working fluid sucked to the high pressure compressor 5 to a pressure of the working fluid delivered from the high pressure compressor 5. As shown by FIG. 9, the pressure ratio measured by the second pressure ratio measuring portion 261 is inputted to a second surging control portion 251 of a control portion 250.

As shown by FIG. 8, the temperature measuring portion 262 is a measuring portion of measuring a temperature of the working fluid flowing to the turbine portion 3. As shown by FIG. 9, a temperature measured by the temperature measuring portion 262 is inputted to the corrected revolution number calculating portion 263.

As shown by FIG. 9, the corrected revolution number calculating portion 263 calculates a corrected revolution number N1 by the following equation based on the temperature Ti inputted from the temperature measuring portion 262 and an actual revolution number N of the turbine portion 3.

$$N1 = N/\sqrt{(Ti)}$$

The corrected revolution number N1 calculated by the corrected revolution number calculating portion 263 is inputted to the second surging control portion 251.

Further, as shown by FIG. 9, the control portion 250 of the power generating equipment 201 of the embodiment is provided with the second program control portion 51 for controlling the opening degree V2 of the second bypass valve 43 based on a time period elapsed after inputting the temperature elevation start instruction, the second surging control portion 251 for controlling the opening degree V2 of the second bypass valve 43 by calculating a suction flow rate for preventing surging of the high pressure compressor 5 from being brought about, and a second selecting portion 252 for selecting a control signal having a larger opening degree V2 of the second bypass valve 43 from control signals outputted from the second program control portion 51 and the second surging control portion (control portion) 251.

As shown by FIG. 9, the second surging control portion 251 calculates the suction flow rate for preventing surging of the high pressure compressor 5 from being brought about based on the pressure ratio inputted from the second pressure ratio measuring portion 261 and the corrected revolution number N1 inputted from the corrected revolution number calculating portion 263, calculates the opening degree V2 of the second bypass valve 43 based on the calculated suction flow rate and outputs the control signal of controlling the opening degree V2.

The control signal outputted from the second surging control portion 251 is inputted to the second selecting portion 252.

Here, the calculated suction flow rate for preventing surging from being brought about is a flow rate of adding a predetermined allowance (margin) to the suction flow rate of bringing about surging in the high pressure compressor 5. Therefore, the calculated opening degree V2 of the second bypass valve 43 is an opening degree by which the working fluid of the flow rate added with the above-described margin flows to the high pressure compressor 5.

As shown by FIG. 9, the second selecting portion 252 selects the control signal having the larger opening degree in the opening degrees V2 of the second bypass valve 43 applied to the control signal inputted from the feedback control portion 51 and the control signal inputted from the second surging control portion 251.

The selected control signal is outputted from the second selecting portion 252 to the second bypass valve 43.

Next, a control in starting the power generating equipment 201 constituting a characteristic of the embodiment will be explained.

Further, although in starting, the second program control portion 51 and the second surging control portion 251 respectively calculate the opening degrees V2 of the second bypass valve 43 and output the control signals, a calculation of the opening degree V2 of the second bypass valve 43 by the second program control portion 51 is similar to that in the case of the first embodiment, and therefore, an explanation thereof will be omitted.

Further, power generation at the power generating equipment 201 is similar to power generation according to the first embodiment, and therefore, an explanation thereof will be omitted.

Figure 10:
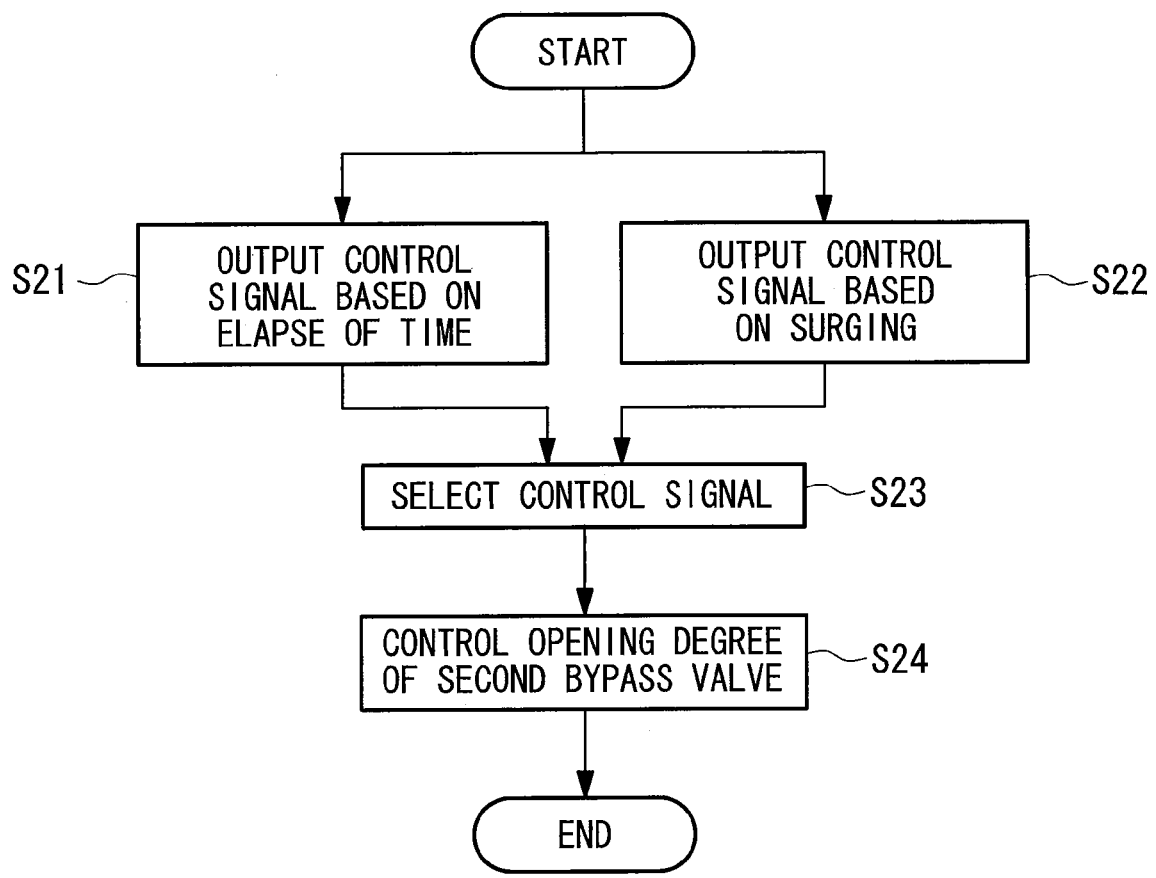
FIG. 10 is a flowchart for explaining a control in starting the power generating equipment of FIG. 9.

FIG. 10 is a flowchart for explaining a control in starting the power generating equipment of FIG. 9.

In starting the power generating equipment 201, as shown by FIG. 10, a calculation of the bypass flow rate at the feedback control portion 51, and a calculation of the opening degree V2 of the second bypass valve 43 (step S21 (first calculating step)), a calculation of the bypass flow rate at the second surging control portion 251, and a calculation of the opening degree V2 of the second bypass valve 43 (step S22 (second calculating step)) are executed independently from each other.

As shown by FIG. 9, the second surging control portion 251 of the control portion 250 is inputted with a ratio of pressures of the working fluid on the suction side and the delivery side of the high pressure compressor 5 from the second pressure ratio measuring portion 261, and inputted with the corrected revolution number N1 from the corrected revolution number calculating portion 263.

The second surging portion 251 calculates the suction flow rate for preventing surging of the high pressure compressor 5 from being brought about based on the inputted pressure ratio and the inputted corrected revolution number N1. The flow rate for preventing surging from being brought about in the second surging control portion 251 is calculated based on a table or the like stored previously to the second surging control portion 251.

The second surging control portion 251 further calculates the opening degree V2 of the second bypass valve 43 based on the calculated suction flow rate and outputs the control signal of controlling the opening degree of the second bypass valve 43 to the second selecting portion 252.

As shown by FIG. 9, the second selecting portion 252 is inputted with the control signal of controlling the opening degree V2 of the second bypass valve 43 from the second surging control portion 251 and inputted with the control signal of controlling the opening degree V2 of the second bypass valve 43 also from the second program control portion 51.

The second selecting portion 252 selects the control signal having the larger opening degree of the second bypass valve 43 from the inputted control signals and outputs the selected control signal to the second bypass valve 43 (step S23 (selecting step)).

At the second bypass valve 43, the opening degree V2 is controlled based on the inputted control signal and the flow rate of the working fluid flowing to the second bypass valve 32 is controlled (step S24 (flow rate controlling step)).

According to the above-described constitution, the bypass flow rate having the larger flow rate is selected from the bypass flow rate based on a time period elapsed after starting to elevate the temperature of the working fluid, that is, a time period elapsed after inputting the temperature elevation start instruction and the bypass flow rate for preventing surging of the high pressure compressor 5 from being brought about and the flow rate of the bypassed working fluid is controlled to the selected bypass flow rate, and therefore, it is prevented that the torque applied to the speed reduction gear portion 6 becomes proximate to 0 more than the target torques Q and −Q and surging is brought about at the compressor 5.

Particularly, surging of the high pressure compressor 5 can be prevented from being brought about even under a situation of easily bringing about surging of the high pressure compressor 5 by a disturbance.

Third Embodiment

Next, a third embodiment of the invention will be explained in reference to FIG. 11 through FIG. 13.

Although a basic constitution of a power generating equipment of the embodiment is similar to that of the second embodiment, the third embodiment differs from the second embodiment in a method of controlling the first bypass valve. Therefore, according to the embodiment, only the method of controlling the first bypass valve will be explained in reference to FIG. 11 through FIG. 13, an explanation of other constituent element or the like will be omitted.

Figure 11:
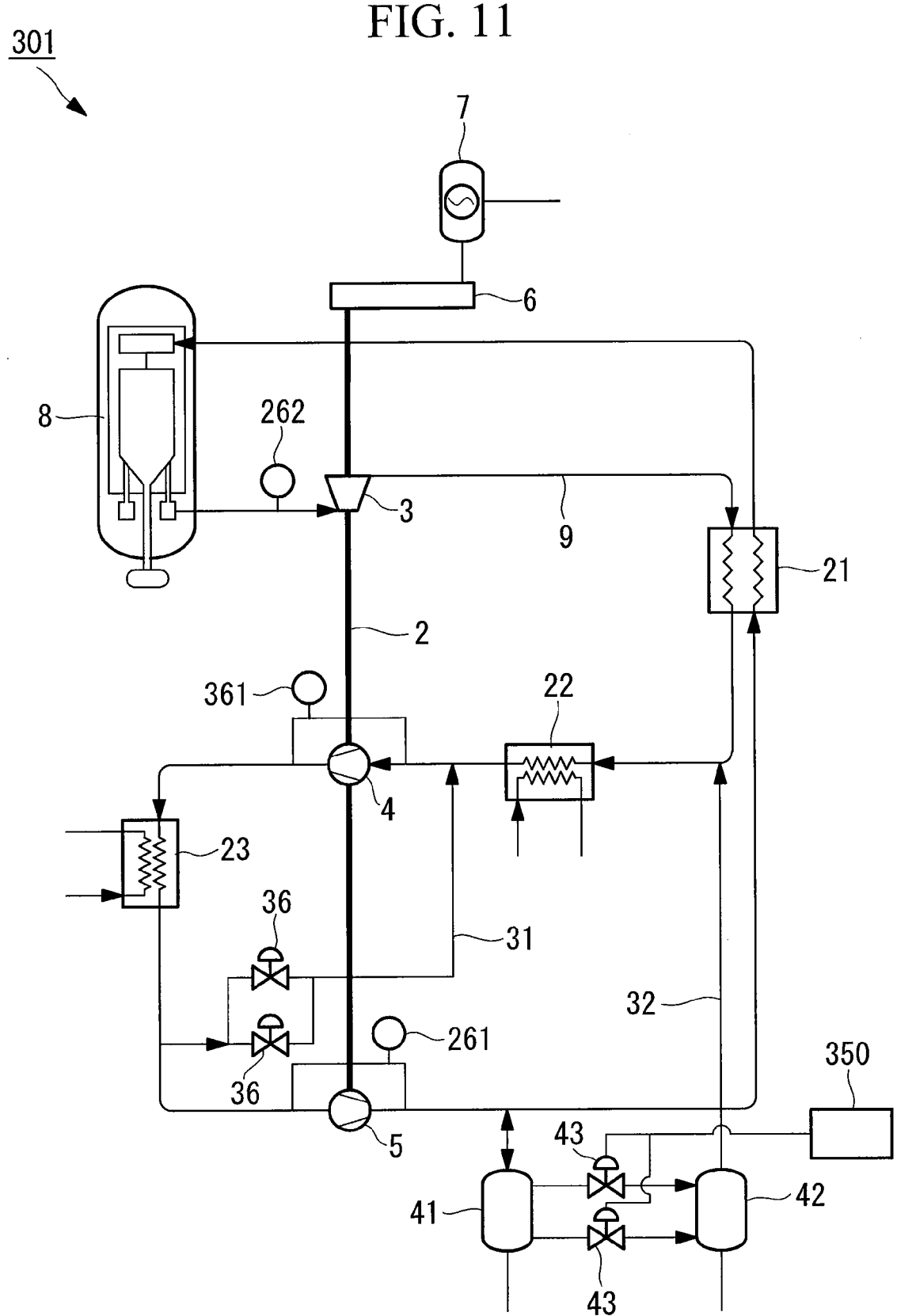
FIG. 11 is a schematic view for explaining a constitution of a power generating equipment according to a third embodiment of the invention.

FIG. 11 is a schematic view for explaining a constitution of the power generating equipment according to the embodiment. FIG. 12 is a block diagram for explaining a control of the power generating equipment of FIG. 11.

Further, constituent elements the same as those of the second embodiment are attached with the same notations and an explanation thereof will be omitted.

Figure 12:
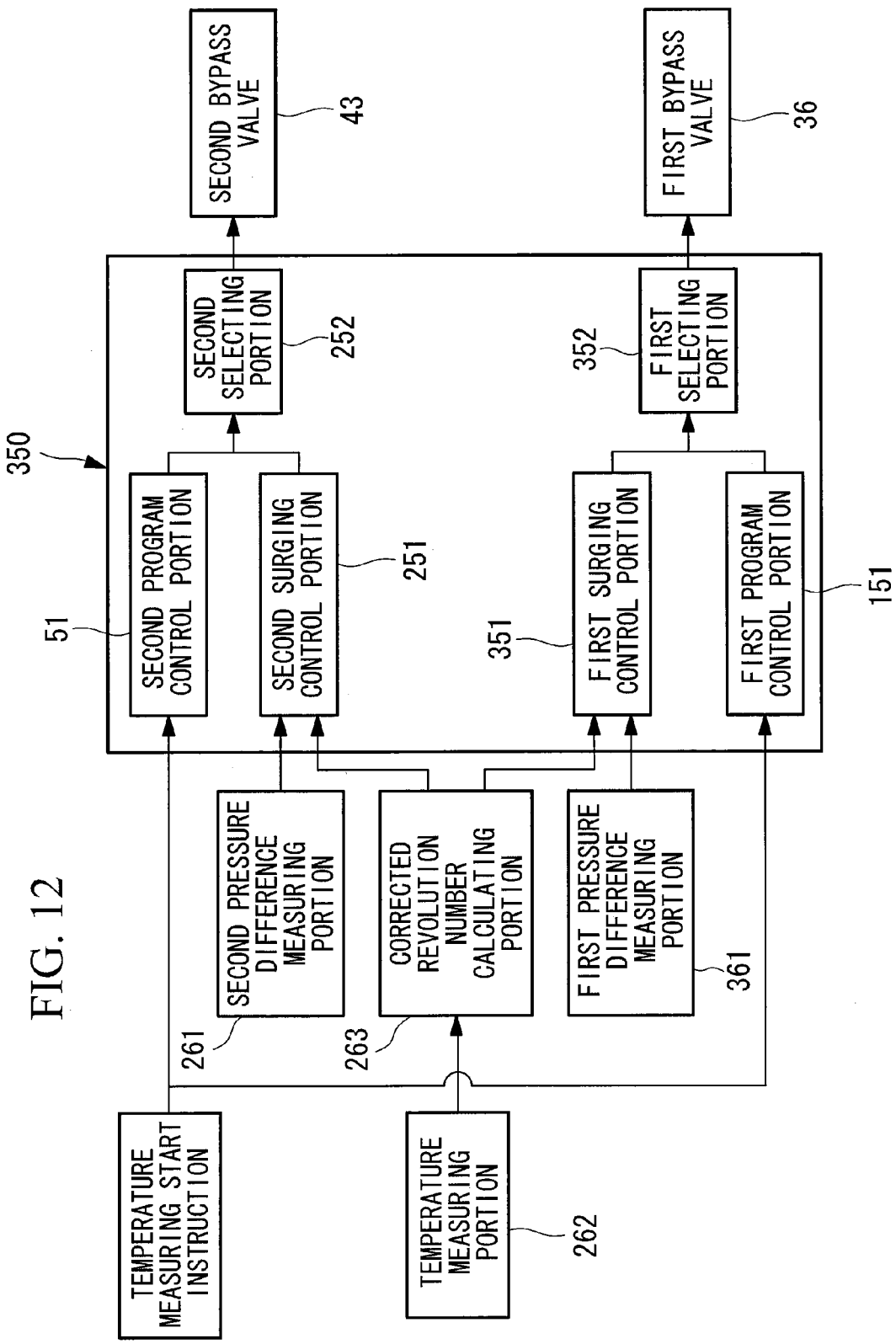
FIG. 12 is a block diagram for explaining a control of the power generating equipment of FIG. 11.

As shown by FIG. 11 and FIG. 12, a power generating equipment 301 of the embodiment is further provided with a first pressure ratio measuring portion 361 for measuring a pressure ratio of a pressure of the working fluid on the suction side of the low pressure compressor 4 to a pressure of the working fluid on the delivery side.

As shown by FIG. 11, the first pressure ratio measuring portion 361 is a measuring portion for measuring a ratio of a pressure of the working fluid sucked to the low pressure compressor 4 to the pressure of the working fluid delivered from the low pressure compressor 4. As shown by FIG. 12, the pressure ratio measured by the first pressure ratio measuring portion 361 is inputted to a first surging control portion 351 of the control portion 350.

Further, as shown by FIG. 12, the control portion 350 of the power generating equipment 301 of the embodiment is provided with the first program control portion 151 for controlling the opening degree V1 of the first bypass valve 36 based on a time period elapsed after inputting the temperature elevation start instruction, a first surging control portion (control portion) 351 for controlling the opening degree V1 of the first bypass valve 36 by calculating the suction flow rate for preventing surging of the low pressure compressor 4 from being brought about, and a first selecting portion 352 for selecting a control signal having a larger opening degree of the first bypass valve 36 from the control signals outputted from the program control portion 151 and the first surging control portion 351.

As shown by FIG. 12, the first surging control portion 351 calculates the suction flow rate for preventing surging of the low pressure compressor 4 from being brought about based on the pressure ratio inputted from the first pressure ratio measuring portion 361 and the corrected revolution number N1 inputted from the corrected revolution number calculating portion 263, calculates the opening degree V1 of the first bypass valve 36 based on the calculated suction flow rate and outputs the control signal for controlling the opening degree.

The control signal outputted from the first surging control portion 351 is inputted to the first selecting portion 352.

Here, the calculated suction flow rate for preventing surging from being brought about is a flow rate of adding a predetermined allowance (margin) to the suction flow rate of bringing about surging at the low pressure compressor 4. Therefore, the calculated opening degree V1 of the first bypass valve 36 is an opening degree by which the working fluid of the flow rate added with the above-described margin flows to the low pressure compressor 4.

As shown by FIG. 12, the first selecting portion 352 selects the control signal having the larger opening degree from the opening degrees V1 of the first bypass valve 36 applied to the control signal inputted from the program control portion 151 and applied to the control signal inputted from the first surging control portion 351.

The selected control signal is outputted from the first selecting portion 352 to the first bypass valve 36.

Next, a control in starting the power generating equipment 301 constituting a characteristic of the embodiment will be explained.

In starting the power generating equipment 301, similar to the second embodiment, a signal of controlling the opening degree V2 of the second bypass valve 43 is inputted from the second program control portion 51 and the second surging control portion 251 to the second selecting portion 252, and the control signal selected by the second selecting portion 252 is inputted to the second bypass valve 43.

Figure 13:
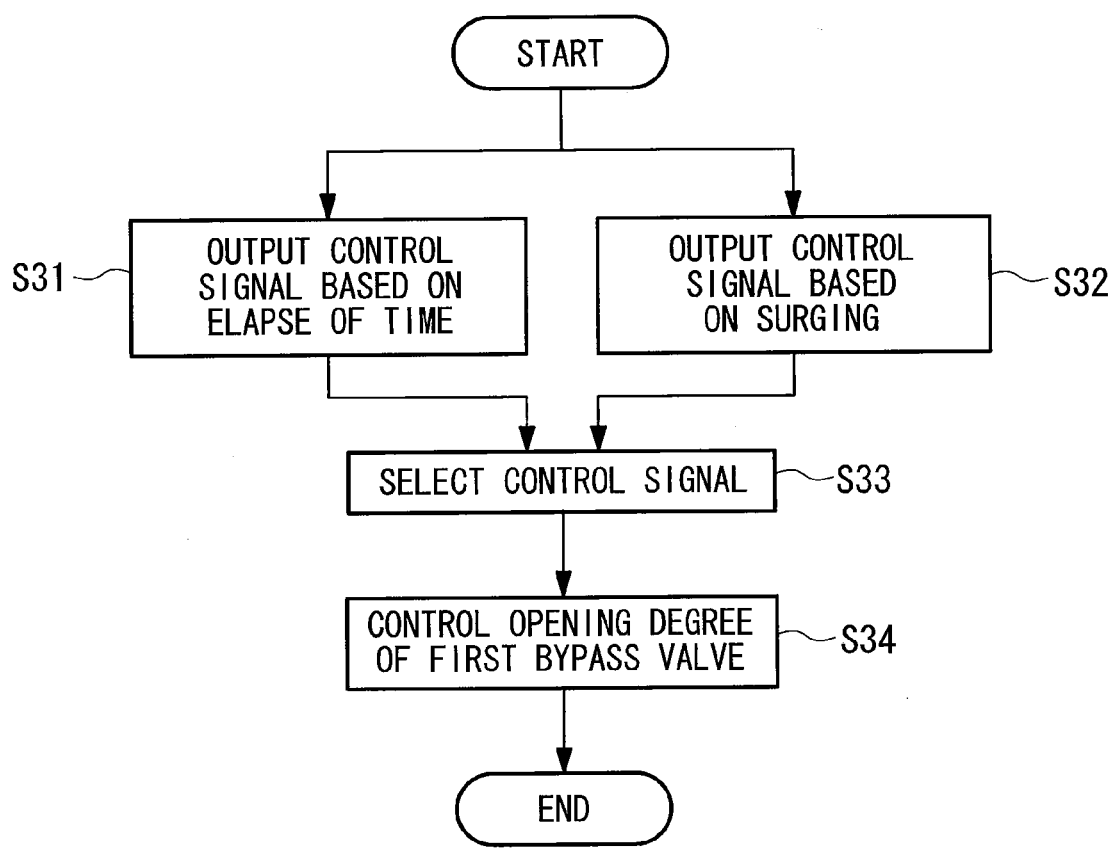
FIG. 13 is a flowchart for explaining a control in starting the power generating equipment of FIG. 11.

FIG. 13 is a flowchart for explaining the control in starting the power generating equipment of FIG. 11.

Simultaneously with the control of the opening degree of the above-described second bypass valve 43, as shown by FIG. 13, a calculation of the bypass flow rate at the program control portion 151, and a calculation of the opening degree of the first bypass valve 36 (step S31 (first calculating step)), a calculation of the bypass flow rate at the first surging control portion 351, and a calculation of the opening degree of the first bypass valve 36 (step S32 (second calculating step)) are executed independently from each other.

As shown by FIG. 12, the first surging control portion 351 of the control portion 350 is inputted with the ratio of the pressures of the working fluid on the suction side and the delivery side of the low pressure compressor 4 from the first pressure ratio measuring portion 361 and inputted with the corrected revolution number N1 from the corrected revolution number calculating portion 263.

The first surging control portion 351 calculates the suction flow rate for preventing the surging of the low pressure compressor 4 from being brought about based on the inputted pressure ratio and the inputted corrected revolution number N1. The flow rate for preventing surging from being brought about in the first surging control portion 351 is calculated based on a table or the like previously stored to the first surging control portion 351.

The first surging control portion 351 further calculates the opening degree V1 of the first bypass valve 36 based on the calculated suction flow rate and outputs the control signal of controlling the opening degree of the first bypass valve 36 to the first selecting portion 352.

As shown by FIG. 12, the first selecting portion 352 is inputted with the control signal of controlling the opening degree V1 of the first bypass valve 36 from the first surging control portion 351 and inputted with the control signal of controlling the opening degree V1 of the first bypass valve 36 also from the program control portion 151.

The first selecting portion 352 selects the control signal having the larger opening degree of the first bypass valve 36 from the inputted control signals and outputs the selected control signal to the first bypass valve 36 (step S33 (selecting step)).

At the first bypass valve 36, the opening degree is controlled based on the inputted control signal and the flow rate of the working fluid flowing through the first bypass flow path 31 is controlled (step S34 (flow rate controlling step)).

According to the above-described constitution, the bypass flow rate having the larger flow rate is selected from the bypass flow rate based on a time period elapsed after inputting the temperature elevation start instruction and the bypass flow rate for preventing surging of the low pressure compressor 4 from being brought about, and the flow rate of the bypass working fluid is controlled to the selected bypass flow rate, and therefore, it can be prevented that the torque applied to the speed reduction gear portion 6 becomes proximate to 0 more than the target torques Q and –Q and surging is brought about at the low pressure compressor 4.

Particularly, surging of the low pressure compressor 4 can be prevented from being brought about even under a situation in which surging of the low pressure compressor 4 is easy to be brought about by a disturbance.

Further, the technical range of the invention is not limited to the above-described embodiments but can variously be modified within the range not deviated from the gist of the invention.

For example, although according to the above-described embodiments, an explanation has been given by being applied to an example in which the compressor is constituted by two stages, that is, the low pressure compressor 4 and the high pressure compressor 5, the compressor may be constituted by one stage or constituted by three stages or more and is not particularly limited.

The invention claimed is:

1. A method of controlling a turbine equipment during a starting operation, the turbine equipment including: a compressor portion for compressing a working fluid; atomic reactor for heating the compressed working fluid; a turbine portion driven to rotate by the heated working fluid; a circulating flow path for circulating the working fluid at least among the compressor portion, the atomic reactor and the turbine portion and a generator which is connected to the turbine portion and the compressor portion by way of a speed reducing portion and which is configured to function as a motor to rotate the compressor portion and the turbine portion by way of the speed reducing portion during the starting operation, the method comprising:

during the starting operation, using the generator as a motor to transmit torque in a first or negative direction through the speed reducing portion in which torque is transmitted from the generator to the compressor portion and the turbine portion to rotate the compressor portion and the turbine portion and thereby circulate working fluid around the circulating flow path;

when the turbine is at a desired speed, a temperature elevating step of controlling the atomic reactor to elevate a temperature of the working fluid flowing to the turbine portion and, at the same time, a flow rate increasing step of increasing a flow rate of the working fluid bypassed from a delivery side to a suction side of the compressor portion to increase the negative value of the torque transmitted through the speed reducing portion at or above a predetermined value;

a first calculating step of calculating the flow rate of the bypassed working fluid in the flow rate increasing step and a flow rate reducing step based on an elapsed time period after starting to elevate the temperature of the working fluid flowing to the turbine portion;

a second calculating step of calculating a bypass flow rate necessary for preventing surging from being brought about in the compressor portion based on a pressure ratio between the suction side and the delivery side of the compressor portion, and the modified revolution number of the compressor portion calculated based on the temperature of the working fluid sucked to the compressor portion;

a selecting step of selecting the bypass flow rate having a larger flow rate from the bypass flow rates calculated by the first and the second calculating step; and a flow rate controlling step of controlling the flow rate of the working fluid bypassed from the delivery side to the suction side of the compressor portion after an elapse of a predetermined time period after increasing the flow rate of the bypassed working fluid thereby reducing the torque required to drive the compressor portion such that the torque applied to the speed reducing portion changes from a negative torque at or above the pre-determined value to a positive torque where torque is transmitted from the turbine portion the the generator, at or above a pre-determined value to reduce the amount of time spent in a potentially damaging transition from the negative torque to the positive torque but ensuring that the flow rate of the bypassed working fluid does not decrease below the selected bypass flow rate to thereby prevent surging of the compressor portion.

2. A turbine equipment, comprising:

a compressor portion configured to compress a working fluid;

an atomic reactor configured to heat the working fluid;

a turbine portion driven to rotate by the working fluid;

a circulating flow path configured to circulate the working fluid at least between the compressor portion, the atomic reactor and the turbine portion;

a bypass flow path configured to bypass the working fluid from a delivery side to a suction side of the compressor portion;

a flow rate controlling portion configured to control a flow rate of the working fluid flowing through the bypass flow path;

a generator which is connected to the turbine portion and the compressor portion through a speed reducing portion and which is configured during starting of the turbine equipment to function as a motor configured to transmit torque in a first or negative direction to rotate the compressor portion and the turbine portion by way of the speed reducing portion; and a controller configured to control the turbine equipment by controlling the generator to increase the rotational speed of the compressor portion and the turbine portion to the desired speed;

when the compressor portion is at the desired speed and in response to a temperature elevation start instruction controlling the atomic reactor to elevate a temperature of the working fluid flowing to the turbine portion, controlling the flow rate controlling portion to increase a flow rate of the working fluid bypassed from a delivery side to a suction side of the compressor portion at the same time as the controlling the atomic reactor to elevate the temperature of the working fluid flowing to the turbine portion to increase the negative value of the torque transmitted through the speed reducing portion at or above a predetermined value;

calculating a bypass flow rate based on the time from the temperature elevation start instruction;

calculating a bypass flow rate which will prevent surging of the compressor portion from being brought about based on a pressure ratio between a suction side and a delivery side of the compressor portion, and a corrected rotational speed of the compressor portion calculated based on a temperature of the working fluid delivered to the turbine;

selecting the bypass flow rate having a larger flow rate from the bypass flow rates calculated by the calculating steps; and controlling the flow rate controlling portion to reduce the flow rate of the bypassed working fluid after an elapse of a predetermined time period after increasing the flow rate of the bypassed working fluid thereby reducing the torque required to drive the compressor portion such that the torque applied to the speed reducing portion changes from a negative torque at or above the pre-determined value to a positive torque where torque is transmitted from the turbine portion the generator, at or above a pre-determined value to reduce the amount of time spent in a potentially damaging transition from the negative torque to the positive torque but ensuring that the flow rate of the bypassed working fluid does not decrease below the selected bypass flow rate to thereby prevent surging of the compressor portion.

3. A method as claimed in claim 1, in which the compressor portion includes a low pressure compressor, a first bypass flow path extending between a delivery side and a suction side of the low pressure compressor, a first bypass valve configured to control the flow rate of working fluid flowing through the first bypass flow path, a high pressure compressor, a second bypass flow path extending between a delivery side and a suction side of the high pressure compressor and a second bypass valve configured to regulate the flow of working fluid through the second bypass flow path, the method including calculating a bypass flow rate which would prevent surging of the low pressure compressor from being brought about based on a pressure ratio between the suction side and the delivery side of the low pressure compressor and a corrected rotational speed of the low pressure compressor and calculating a bypass flow rate which will prevent surging of the high pressure compressor from being brought about based on a pressure ratio between the suction side and the delivery side of the high pressure compressor and a corrected rotational speed of the high pressure compressor and controlling the operation of the first bypass valve and second bypass valve to reduce the flow rate of the bypassed working fluid after an elapse of a predetermined time period after increasing the flow rate of the bypassed working fluid thereby reducing the torque required to drive the low pressure compressor and high pressure compressor such that the torque applied to the speed reducing portion changes from a negative torque at or above the predetermined value to a positive torque but ensuring that the flow rates of the bypassed working fluid do not decrease below the minimum bypass flow rates required to prevent surging of the low pressure compressor and the high pressure compressor.

4. A turbine equipment as claimed in claim 2, which the compressor portion includes a low pressure compressor and a high pressure compressor, the low pressure compressor, high pressure compressor and turbine being mounted on the same shaft to which the generator is drivingly connected by the speed reducing portion.

5. A turbine equipment as claimed in claim 4 which includes a first bypass flow path which extends between a delivery side and a suction side of the low pressure compressor and a first bypass valve configured to regulate the flow of working fluid through the first bypass flow path, a second bypass flow path which extends between a delivery side and a suction side of the high pressure compressor and a second bypass valve configured to regulate the flow of working fluid flowing through the second bypass flow path, the controller being configured to calculate a bypass flow rate necessary for preventing surging from being brought about in the low pressure compressor and the high pressure compressor and regulating the operation of the first and second bypass valves to ensure that as the flow rate of the bypassed working fluid is reduced, it does not decrease below a flow rate which would result in surging of the high pressure compressor or the low pressure compressor.

* * * * *